United States Patent
Zeine et al.

(10) Patent No.: US 10,079,494 B2
(45) Date of Patent: Sep. 18, 2018

(54) REMOVABLY ATTACHABLE PORTABLE DEVICE APPARATUS WITH INTEGRATED WIRELESS POWER RECEIVING FACILITIES

(71) Applicant: Ossia Inc., Bellevue, WA (US)

(72) Inventors: Hatem Ibrahim Zeine, Bellevue, WA (US); Siamak Ebadi, Bellevue, WA (US); Alireza Saghati, Bellevue, WA (US); Anas Alfarra, Bellevue, WA (US); Ben Renneberg, Bellevue, WA (US)

(73) Assignee: Ossia Inc., Bellevue, WA (US)

( * ) Notice: Subject to any disclaimer, the term of this patent is extended or adjusted under 35 U.S.C. 154(b) by 188 days.

(21) Appl. No.: 15/048,984

(22) Filed: Feb. 19, 2016

(65) Prior Publication Data

US 2016/0301217 A1    Oct. 13, 2016

Related U.S. Application Data

(60) Provisional application No. 62/146,233, filed on Apr. 10, 2015, provisional application No. 62/275,383, filed on Jan. 6, 2016.

(51) Int. Cl.
| | |
|---|---|
| *H01F 27/42* | (2006.01) |
| *H01F 37/00* | (2006.01) |
| *H01F 38/00* | (2006.01) |
| *H02J 5/00* | (2016.01) |
| *H04B 1/3883* | (2015.01) |
| *H02J 7/02* | (2016.01) |

(Continued)

(52) U.S. Cl.
CPC .............. *H02J 5/005* (2013.01); *H02J 7/025* (2013.01); *H04B 1/3877* (2013.01); *H04B 1/3883* (2013.01); *H04M 1/185* (2013.01)

(58) Field of Classification Search
CPC . H02J 5/005; H02J 7/025; H02J 17/00; H01F 38/14; B60L 11/182
USPC ........................................................ 307/104
See application file for complete search history.

(56) References Cited

U.S. PATENT DOCUMENTS

| | | |
|---|---|---|
| 5,982,103 A | 11/1999 | Mosebrook et al. |
| 6,178,140 B1 | 1/2001 | Schlieter |
| 6,448,490 B1 | 9/2002 | Katz |

(Continued)

FOREIGN PATENT DOCUMENTS

WO    2013142720 A1    9/2013

*Primary Examiner* — Quan Tra

(57) ABSTRACT

Embodiments of the present disclosure describe removably attachable portable device apparatuses with integrated wireless power receiving facilities (also referred to as wireless power reception apparatuses herein). In some embodiments, a wireless power reception apparatus for a portable electronic device is described. The wireless power reception apparatus can include a housing, one or more antennas, and a wireless power receiver. The housing is configured to be removably attachable to the portable electronic device. The one or more antennas are situated on or within the housing and are configured to receive wireless power from a wireless charging (or wireless power transmission) system. The wireless power receiver is disposed within the housing and is configured to process the wireless power received via the one or more antennas and provide the received power to the portable electronic device via a power interface port.

20 Claims, 14 Drawing Sheets

(51) Int. Cl.
*H04B 1/3877* (2015.01)
*H04M 1/18* (2006.01)

(56) References Cited

U.S. PATENT DOCUMENTS

| | | |
|---|---|---|
| 8,072,380 B2 | 12/2011 | Crouch |
| 8,310,201 B1 | 11/2012 | Wright |
| 9,331,519 B2 * | 5/2016 | Lin .................. H02J 7/025 |
| 2003/0153266 A1 | 8/2003 | Kim et al. |
| 2003/0220092 A1 | 11/2003 | Hethuin |
| 2005/0136845 A1 | 6/2005 | Masuoka et al. |
| 2007/0008132 A1 | 1/2007 | Bellantoni |
| 2007/0222681 A1 * | 9/2007 | Greene .............. H01M 2/1022 343/700 MS |
| 2008/0217309 A1 | 9/2008 | Rodgers |
| 2010/0033021 A1 * | 2/2010 | Bennett .................. H02J 17/00 307/104 |
| 2010/0041349 A1 | 2/2010 | Mahany et al. |
| 2010/0178919 A1 | 7/2010 | Deepak et al. |
| 2010/0279606 A1 * | 11/2010 | Hillan .................... H04B 5/00 455/41.1 |
| 2010/0315045 A1 * | 12/2010 | Zeine .................... H02J 7/025 320/137 |
| 2010/0328073 A1 | 12/2010 | Nikitin et al. |
| 2011/0103517 A1 | 5/2011 | Hamalainen |
| 2012/0013294 A1 * | 1/2012 | Yeh ........................ H02J 7/025 320/108 |
| 2012/0262004 A1 | 10/2012 | Cook et al. |
| 2012/0274154 A1 | 11/2012 | DeLuca |
| 2012/0276854 A1 | 11/2012 | Joshi et al. |
| 2012/0302297 A1 | 11/2012 | Patel et al. |
| 2013/0026981 A1 | 1/2013 | Van Der Lee |
| 2013/0106661 A1 | 5/2013 | Xiang |
| 2013/0154892 A1 | 6/2013 | Zeltser et al. |
| 2013/0273870 A1 | 10/2013 | Shi |
| 2014/0091626 A1 | 4/2014 | Walley et al. |
| 2014/0117928 A1 | 5/2014 | Liao |
| 2014/0217967 A1 | 8/2014 | Zeine et al. |
| 2014/0268519 A1 | 9/2014 | Huang et al. |
| 2014/0284226 A1 * | 9/2014 | Chen ...................... A45C 11/00 206/37 |
| 2014/0302869 A1 | 10/2014 | Rosenbaum et al. |
| 2014/0306651 A1 * | 10/2014 | Lin ........................ H02J 7/025 320/108 |
| 2014/0361735 A1 | 12/2014 | Li et al. |
| 2015/0022022 A1 | 1/2015 | Zeine |
| 2015/0077047 A1 * | 3/2015 | Chen ...................... H02J 7/025 320/108 |
| 2016/0013678 A1 * | 1/2016 | Bell ........................ H02J 50/80 320/108 |
| 2016/0134142 A1 | 5/2016 | Murphy ................ H02J 7/0054 455/573 |
| 2016/0285301 A1 * | 9/2016 | Kim ........................ H02J 7/025 |

* cited by examiner

REMOVABLY ATTACHABLE PORTABLE DEVICE APPARATUS WITH INTEGRATED WIRELESS POWER RECEIVING FACILITIES

CROSS-REFERENCE TO RELATED APPLICATIONS

This application claims priority to and benefit from U.S. Provisional Patent Application Ser. No. 62/146,233 titled "SYSTEMS AND METHODS FOR WIRELESS CHARGING," filed on Apr. 10, 2015 and U.S. Provisional Patent Application Ser. No. 62/275,383 titled "WIRELESS CHARGING SYSTEMS FOR HANDHELD AND CONSUMER ELECTRONIC DEVICES," filed on Jan. 6, 2016, both of which are expressly incorporated by reference herein.

BACKGROUND

The use of mobile communication devices (or mobile devices), such as personal data assistants (PDAs), cell phones (including smart phones or mobile phones), and tablet computers, is ubiquitous. These devices must be supplied with electricity to function and typically include rechargeable batteries to enable portability. The rechargeable batteries are typically recharged through the use of battery chargers which plug into a port on the mobile device and to an electrical outlet to facilitate the transfer of electrical power. Consequently, when a mobile device is charging, the device essentially becomes tethered to the wall and its portability aspect is lost for the duration of time the battery is recharged.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
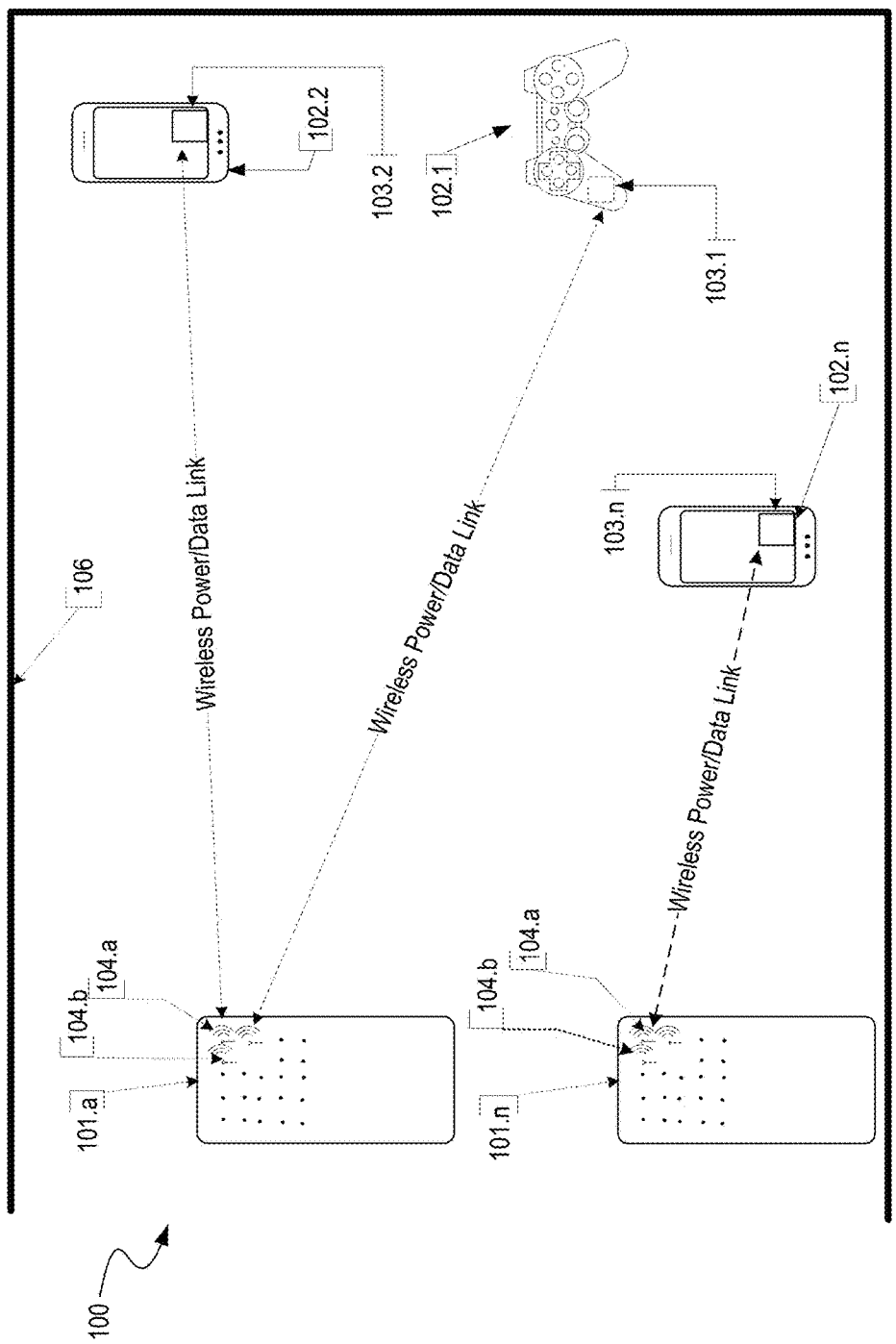
FIG. 1 depicts a block diagram illustrating an example wireless power delivery environment depicting wireless power delivery from one or more wireless chargers to various wireless devices within the wireless power delivery environment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the present disclosure describe removably attachable portable device apparatuses with integrated wireless power receiving facilities (also referred to as wireless power reception apparatuses herein). In some embodiments, a wireless power reception apparatus for a portable electronic device is described. The wireless power reception apparatus can include a housing, one or more antennas, and a wireless power receiver. The housing is configured to be removably attachable to the portable electronic device. The one or more antennas are situated on or within the housing and are configured to receive wireless power from a wireless charging (or wireless power transmission) system. The wireless power receiver is disposed within the housing and is configured to process the wireless power received via the one or more antennas and provide the received power to the portable electronic device via a power interface port.

In some embodiments, the wireless power reception apparatus is further configured to dynamically configure a polarity of at least one of the one or more antennas based on the received power level. For example, components of the portable device apparatus can measure signal strengths and/or otherwise determine an amount or quantity of power that is received in each of multiple antenna polarity configurations.

In some embodiments, the wireless power reception further includes one or more battery modules configured to store the received wireless power and/or a input interface disposed on the housing. The power interface port can configured to provide the stored wireless power to one or more batteries of the portable electronic device responsive to activation of the input interface.

In some embodiments, the housing is removably attachable to the portable electronic device via one or more of magnets, adhesives, or clips.

In some embodiments, the one or more antennas are situated within the inner portion of the housing or within the outer portion of the housing.

In some embodiments, the wireless power receiver includes one or more electronic circuit boards situated within the housing, wherein to process the wireless power received via the one or more antennas, the one or more electronic circuit boards are configured to convert received wireless radio frequency (RF) power to direct current (DC) power.

In some embodiments, the one or more electronic circuit boards include radio frequency (RF) circuitry, control circuitry, and charging electronics.

In some embodiments, the housing is constructed of a radio frequency (RF) transparent material.

In some embodiments, the housing comprises at least one of the one or more antennas.

In some embodiments, the housing comprises at least one or more reflector or director plane situated on the inner surface or the outer surface of the housing. The one or more reflector or director planes can be constructed using thin film, copper tape or printed metal.

In some embodiments, a wireless power reception sleeve for a portable electronic device is described. The wireless power reception sleeve includes a housing, one or more antennas, one or more electronic circuit boards, one or more battery module, and a power interface port. The housing is configured to be removably attachable to the portable electronic device. The one or more antennas are situated on or within the housing and to receive wireless alternating current (AC) power from a wireless charging system. The one or more electronic circuit boards situated within the housing and configured to convert the wireless radio frequency (RF) power to direct current (DC) power. The one or more battery modules are configured to store the DC power. The power interface port is disposed on the housing and is configured to provide the stored DC power to one or more batteries of the portable electronic device.

In some embodiments, the wireless power reception sleeve further includes a button disposed on the housing that is configured to provide the DC power to the one or more batteries of the portable electronic device responsive to activation of the button.

In some embodiments, the one or more antennas are situated within an inner portion of the housing which is constructed of a radio frequency (RF) transparent material.

In some embodiments, a charging status indicator, a connection status indicator or a charger detection status indicator disposed on the housing. For example a charger detection status can blink or indicate a particular color when a charger is out of range.

In some embodiments, a wireless power reception case for a portable electronic device is disclosed. The wireless power reception case includes a housing, one or more antennas, one or more electronic circuit boards, one or more battery modules and a power interface port. The housing is configured to be removably attachable to the portable electronic device. The one or more antennas are disposed on or within the housing and are configured to receive wireless alternating current (AC) power from a wireless charging system. The one or more electronic circuit boards are situated within the housing and are configured to convert the wireless radio frequency (RF) power to direct current (DC) power. The one or more battery modules are configured to store the DC power. The power interface port is disposed on the housing and is configured to provide the DC power to one or more batteries of the portable electronic device.

In some embodiments, the one or more electronic circuit boards are configured to cycle through multiple antenna polarity configurations measuring an amount of wireless power received using each of the multiple antenna polarity configurations.

In some embodiments, the one or more electronic circuit boards are configured to select an antenna polarity configuration of the multiple antenna polarity configurations that yields the highest amount of received wireless power.

I. Example Wireless Power Delivery System Overview/Architecture

FIG. 1 is a diagram illustrating an example wireless power delivery environment 100 depicting wireless power delivery from one or more wireless chargers 101 to various wireless devices 102 within the wireless power delivery environment 100. More specifically, FIG. 1 illustrates an example wireless power delivery environment 100 in which wireless power and/or data can be delivered to available wireless devices 102.1-102.n having one or more power receiver clients 103.1-103.n (also referred to herein as "wireless power receivers" or "wireless power clients"). The wireless power receivers are configured to receive isolated wireless power from one or more wireless chargers 101.

As shown in the example of FIG. 1, the wireless devices 102.1-102.n are mobile phone devices 102.2 and 102.n, respectively, and a wireless game controller 102.1, although the wireless devices 102.1-102.n can be any (smart or dumb) wireless device or system that needs power and is capable of receiving wireless power via one or more integrated power receiver clients 103.1-103.n. As discussed herein, the one or more integrated power receiver clients or "wireless power receivers" receive and process power from one or more transmitters/chargers 101.a-101.n and provide the power to the wireless devices 102.1-102.n for operation thereof.

Each charger 101 (also referred to herein as a "transmitter", "array of antennas" or "antenna array system") can include multiple antennas 104, e.g., an antenna array including hundreds or thousands of antennas, which are capable of delivering wireless power to wireless devices 102. In some embodiments, the antennas are adaptively-phased radio frequency antennas. The charger 101 is capable of determining the appropriate phases to deliver a coherent power transmission signal to the power receiver clients 103. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein he term "array" or "array system" may be used include related and peripheral circuitry for signal generation, reception and transmission, such as radios, digital logic and modems. In some embodiments, the charger 101 can have an embedded Wi-Fi hub.

The wireless devices 102 can include one or more receive power clients 103. As illustrated in the example of FIG. 1, power delivery antennas 104a and data communication antennas 104b are shown. The power delivery antennas 104a are configured to provide delivery of wireless radio frequency power in the wireless power delivery environment. The data communication antennas are configured to send data communications to and receive data communications from the power receiver clients 103.1-103 and/or the wireless devices 102.1-102.n. In some embodiments, the data communication antennas can communicate via Bluetooth, Wi-Fi, ZigBee, etc.

Each power receiver client 103.1-103.n includes one or more antennas (not shown) for receiving signals from the chargers 101. Likewise, each charger 101.a-101.n includes an antenna array having one or more antennas and/or sets of antennas capable of emitting continuous wave signals at specific phases relative to each other. As discussed above, each array is capable of determining the appropriate phases for delivering coherent signals to the power receiver clients 102.1-102.n. For example, coherent signals can be determined by computing the complex conjugate of a received beacon signal at each antenna of the array such that the coherent signal is properly phased for the particular power receiver client that transmitted the beacon signal.

Although not illustrated, each component of the environment, e.g., wireless power receiver, charger, etc., can include control and synchronization mechanisms, e.g., a data communication synchronization module. The chargers 101.a-101.n can be connected to a power source such as, for example, a power outlet or source connecting the chargers to a standard or primary alternating current (AC) power supply in a building. Alternatively or additionally, one or more of the chargers 101.a-101.n can be powered by a battery or via other mechanisms.

In some embodiments, the power receiver clients 102.1-102.n and/or the chargers 101.a-101.n utilize reflective objects 106 such as, for example, walls or other RF reflective obstructions within range to transmit beacon signals and/or receive wireless power and/or data within the wireless power delivery environment. The reflective objects 106 can be utilized for multi-directional signal communication regardless of whether a blocking object is in the line of sight between the charger and the power receiver client.

As described herein, each wireless device 102.1-102.n can be any system and/or device, and/or any combination of devices/systems that can establish a connection with another device, a server and/or other systems within the example environment 100. In some embodiments, the wireless devices 102.1-102.n include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. The wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lock/handles, electric light switch controller, electric shavers, etc.

Although not illustrated in the example of FIG. 1, the charger 101 and the power receiver clients 103.1-103.n can each include a data communication module for communication via a data channel. Alternatively or additionally, the power receiver clients 103.1-103.n can direct the wireless devices 102.1-102.n to communicate with the charger via existing data communications modules. Additionally, in some embodiments the beacon signal, which is primarily referred to herein as a continuous waveform, can alternatively or additionally take the form of a modulated signal.

Figure 2:
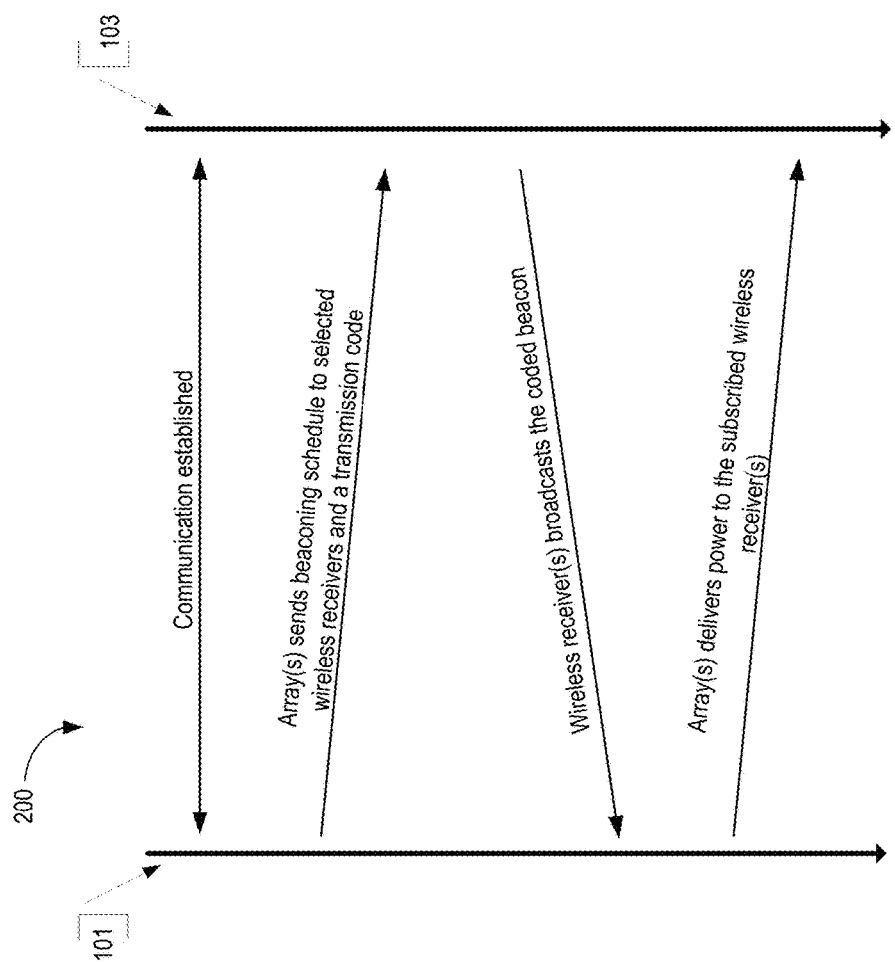
FIG. 2 depicts a sequence diagram illustrating example operations between a wireless charger and a wireless receiver device for commencing wireless power delivery in accordance with some embodiments.

FIG. 2 is a sequence diagram 200 illustrating example operations between a wireless charger 101 and a power receiver client 103 for commencing isolated wireless power delivery, according to an embodiment. Initially, communication is established between the charger 101 and the power receiver client 103. The charger 101 subsequently sends beacon schedule information and a transmission code to the power receiver client 103 to facilitate encoding of the beacon signal by the power receiver client 103 for subsequent isolated wireless power delivery by the charger. The charger 101 can also send power transmission scheduling information so that the power receiver client 103 knows when to expect wireless power from the charger. As discussed herein, the power receiver client 103 generates an encoded beacon signal using the transmission code and broadcasts the encoded beacon during a beacon transmission assignment indicated by the beacon schedule information, e.g., BBS cycle.

As shown, the charger 101 receives the beacon from the power receiver client 103 and decodes the encoded beacon signal using the transmission code provided to the client 103 to ensure that the client 103 is an authorized or selected client. The charger 101 also detects the phase (or direction) at which the beacon signal is received and, once the charger determines that the client is authorized, delivers wireless power and/or data to the power receiver client 103 based the phase (or direction) of the received beacon. In some embodiments, the charger 101 can determine the complex conjugate of the phase and use the complex conjugate to deliver and/or otherwise direct wireless power to the power receiver client 103 in the same direction (or phase) in which the beacon signal was received from the power receiver client 103.

In some embodiments, the charger 101 includes many antennas; one or more of which are used to deliver power to the power receiver client 103. The charger 101 can detect phases at which the beacon signals are received at each antenna. The large number of antennas may result in different coded beacon signals being received at each antenna of the charger 101. The charger may then determine the complex conjugate of the beacon signals received at each antenna. Using the complex conjugates, one or more antenna may emit a signal that takes into account the effects of the large number of antennas in the charger 101. In other words, the charger 101 emits a signal from one or more antennas in such a way as to create an aggregate signal from the one or more of the antennas that approximately recreates the waveform of the beacon in the opposite direction.

As discussed herein, wireless power can be delivered in power cycles defined by power schedule information. A more detailed example of the signaling required to commence wireless power delivery is described now with reference to FIG. 3.

Figure 3:
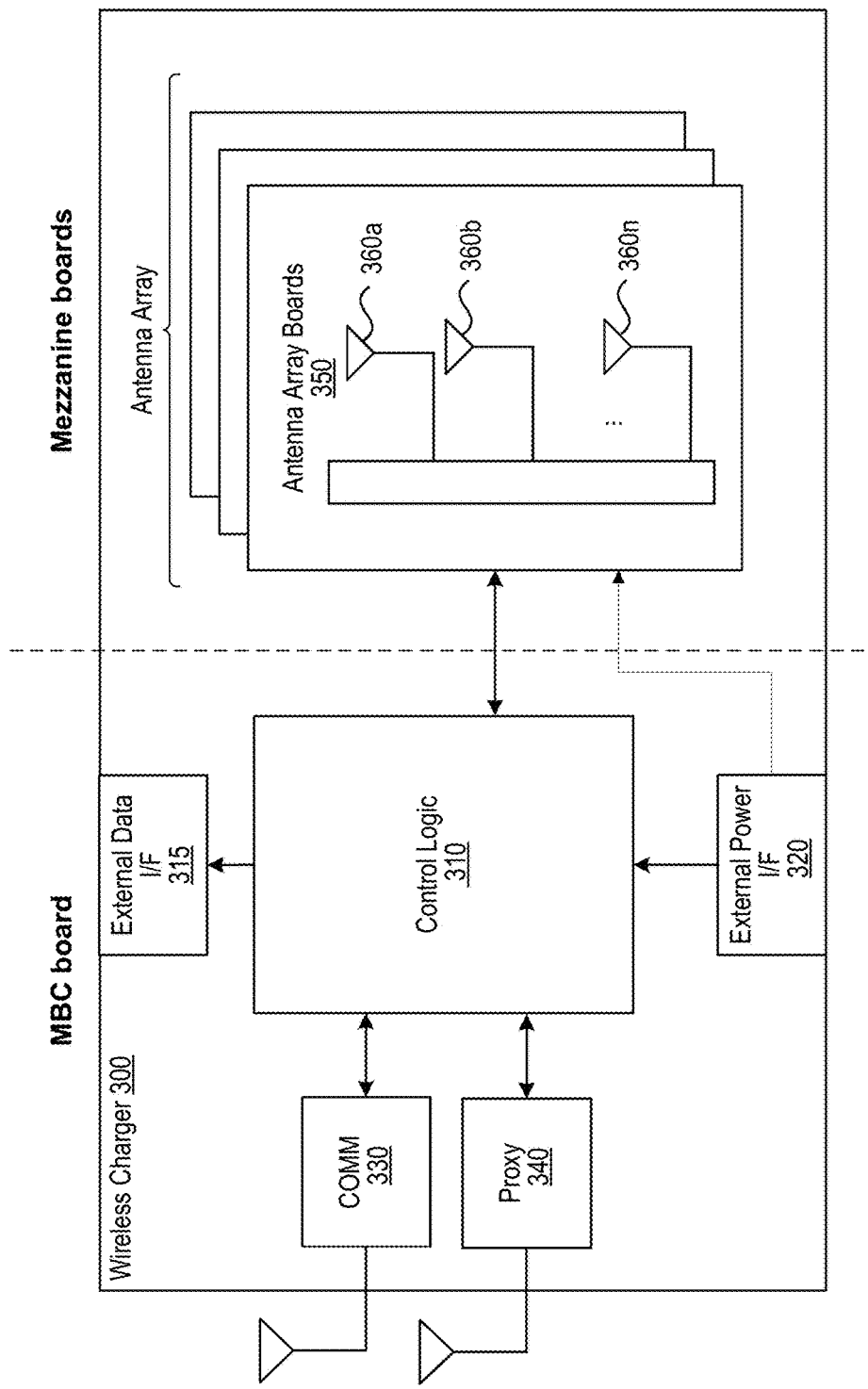
FIG. 3 depicts a block diagram illustrating example components of a wireless power transmitter (charger or wireless power delivery system) in accordance with some embodiments.

FIG. 3 is a block diagram illustrating example components of a wireless charger 300, in accordance with an embodiment. As illustrated in the example of FIG. 3, the wireless charger 300 includes a master bus controller (MBC) board and multiple mezzanine boards that collectively comprise the antenna array. The MBC includes control logic 310, an external data interface (I/F) 315, an external power interface (I/F) 320, a communication block 330, and proxy 340. The mezzanine (or antenna array boards 350) each include multiple antennas 360a-360n. Some or all of the components can be omitted in some embodiments. Additional components are also possible.

The control logic 310 is configured to provide control and intelligence to the array components. The control logic 310 may comprise one or more processors, FPGAs, memory units, etc., and direct and control the various data and power communications. The communication block 330 can direct data communications on a data carrier frequency, such as the base signal clock for clock synchronization. The data communications can be Bluetooth, Wi-Fi, ZigBee, etc. Likewise, the proxy 340 can communicate with clients via data communications as discussed herein. The data communications can be Bluetooth, Wi-Fi, ZigBee, etc.

In some embodiments, the control logic 310 can also facilitate and/or otherwise enable data aggregation for Internet of Things (IoT) devices. In some embodiments, wireless power clients can access, track and/or otherwise obtain IoT information about the device in which the wireless power receiver is embedded and provide that IoT information to the wireless charger 300 over a data connection. This IoT information can be provided to via an external data interface 315 to a central or cloud-based system (not shown) where the data can be aggregated, processed, etc. For example, the central system can process the data to identify various trends across geographies, chargers, environments, devices, etc. In some embodiments, the aggregated data and or the trend data can be used to improve operation of the devices via remote updates, etc. Alternatively or additionally, in some embodiments, the aggregated data can be provided to third party data consumers. In this manner, the wireless charger acts as a Gateway or Enabler for the IoTs. By way of example and not limitation, the IoT information can include capabilities of the device in which the wireless power receiver is embedded, usage information of the device, power levels of the device, information obtained by the device or the wireless power receiver itself, e.g., via sensors, etc.

The external power interface 320 is configured to receive external power and provide the power to various components. In some embodiments, the external power interface 320 may be configured to receive a standard external 24 Volt power supply. Alternative configurations are also possible.

An example of a system power cycle is now described. In this example, the master bus controller (MBC), which controls the charger array, first receives power from a power source and is activated. The MBC then activates the proxy antenna elements on the charger array and the proxy antenna elements enter a default "discovery" mode to identify available wireless receiver clients within range of the charger array. When a client is found, the antenna elements on the charger array power on, enumerate, and (optionally) calibrate.

Next, the MBC generates beacon transmission scheduling information and power transmission scheduling information during a scheduling process. The scheduling process includes selection of power receiver clients. For example, the MBC can select power receiver clients for power transmission and generate a Beacon Beat Schedule (BBS) cycle and a Power Schedule (PS) for the selected wireless power receiver clients. A graphical signaling representation of an example BBS and PS is shown and discussed in greater detail with reference to FIGS. 6 and 7. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy AE broadcasts the BBS to all clients. As discussed herein, the BBS indicates when each client should send a beacon. Likewise the PS indicates when and to which clients the array should send power to. Each client starts broadcasting its beacon and receiving power from the array per the BBS and PS. The Proxy can concurrently query the Client Query Table to check the status of other available clients. A client can only exist in the BBS or the CQT (e.g., waitlist), but not in both. In some embodiments, a limited number of clients can be served on the BBS and PS (e.g., 32). Likewise, the CQT may also be limited to a number of clients (e.g., 32). Thus, for example, if more than 64 clients are within range of the charger, some of those clients would not be active in either the BBS or CQT. The information collected in the previous step continuously and/or periodically updates the BBS cycle and/or the PS.

Figure 4:
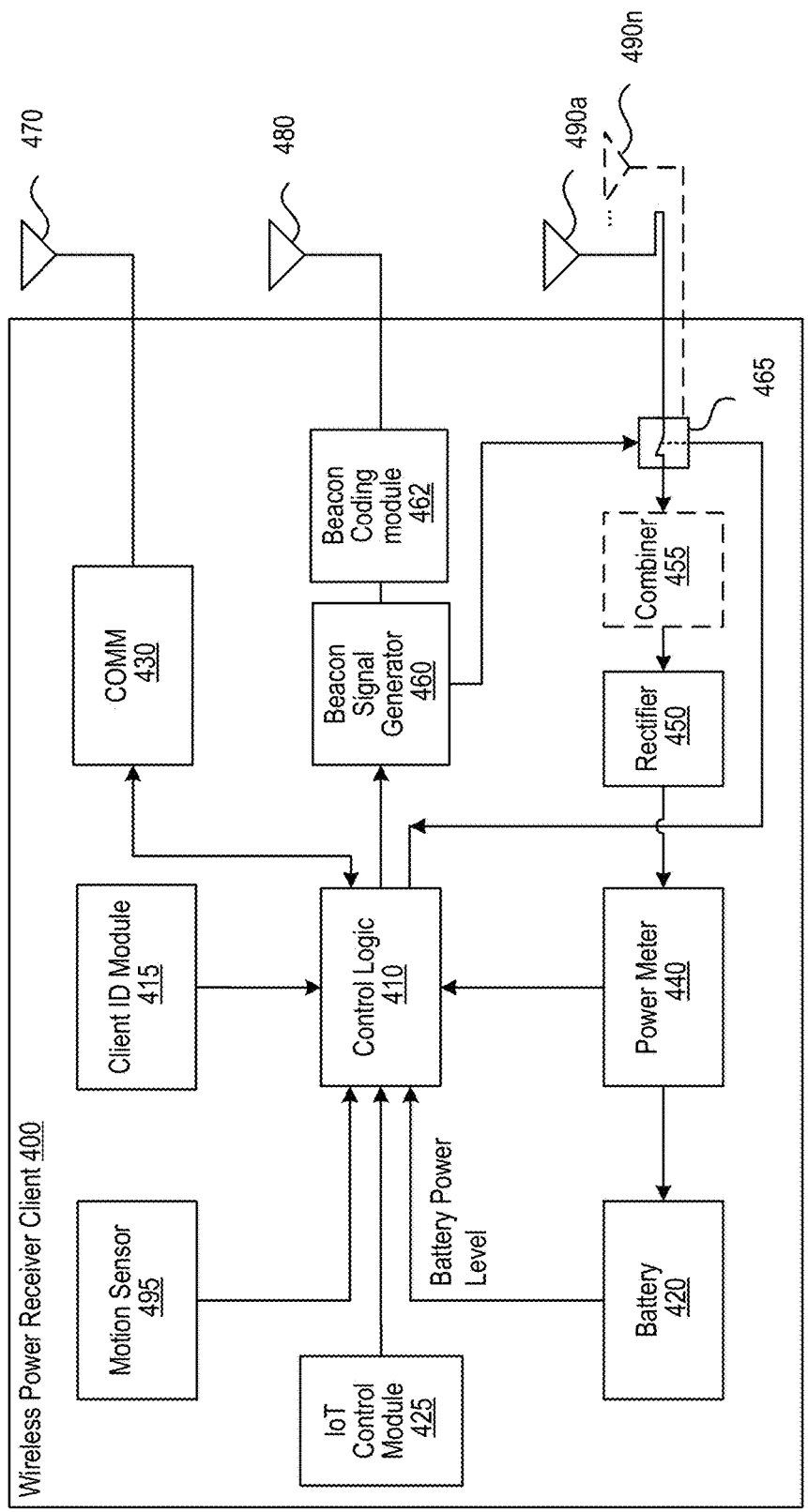
FIG. 4 depicts a block diagram illustrating example components of a wireless power receiver (client) in accordance with some embodiments.

FIG. 4 is a block diagram illustrating example components of a wireless power receiver (client), in accordance with some embodiments. As illustrated in the example of FIG. 4, the receiver 400 includes control logic 410, battery 420, an IoT control module 425, communication block 430 and associated antenna 470, power meter 440, rectifier 450, a combiner 455, beacon signal generator 460, beacon coding unit 462 and an associated antenna 480, and switch 465 connecting the rectifier 450 or the beacon signal generator 460 to one or more associated antennas 490a-n. Some or all of the components can be omitted in some embodiments. For example, in some embodiments, the wireless power receiver client does not include its own antennas but instead utilizes and/or otherwise shares one or more antennas (e.g., Wi-Fi antenna) of the wireless device in which the wireless power receiver is embedded. Additional components are also possible.

A combiner 455 receives and combines the received power transmission signals from the power transmitter in the event that the receiver 400 has more than one antenna. The combiner can be any combiner or divider circuit that is configured to achieve isolation between the output ports while maintaining a matched condition. For example, the combiner 455 can be a Wilkinson Power Divider circuit. The rectifier 450 receives the combined power transmission signal from the combiner 455, if present, which is fed through the power meter 440 to the battery 420 for charging. The power meter 440 measures the received power signal strength and provides the control logic 410 with this measurement.

The control logic 410 also may receive the battery power level from the battery 420 itself. The control logic 410 may also transmit/receive via the communication block 430 a data signal on a data carrier frequency, such as the base signal clock for clock synchronization. The beacon signal generator 460 generates the beacon signal, or calibration signal, transmits the beacon signal using either the antenna 480 or 490 after the beacon signal is encoded.

It may be noted that, although the battery 420 is shown for as charged by and providing power to the receiver 400, the receiver may also receive its power directly from the rectifier 450. This may be in addition to the rectifier 450 providing charging current to the battery 420, or in lieu of providing charging. Also, it may be noted that the use of multiple antennas is one example of implementation and the structure may be reduced to one shared antenna.

In some embodiments, the control logic 410 and/or the IoT control module 425 can communicate with and/or otherwise derive IoT information from the device in which the wireless power receiver client 400 is embedded. Although not shown, in some embodiments, the wireless power receiver client 400 can have one or more data connections (wired or wireless) with the device in which the wireless power receiver client 400 is embedded over which IoT information can be obtained. Alternatively or additionally, IoT information can be determined and/or inferred by the wireless power receiver client 400, e.g., via one or more sensors. As discussed above, the IoT information can include, but is not limited to, information about the capabilities of the device in which the wireless power receiver is embedded, usage information of the device in which the wireless power receiver is embedded, power levels of the battery or batteries of the device in which the wireless power receiver is embedded, and/or information obtained or inferred by the device in which the wireless power receiver is embedded or the wireless power receiver itself, e.g., via sensors, etc.

In some embodiments, a client identifier (ID) module 415 stores a client ID that can uniquely identify the power receiver client in a wireless power delivery environment. For example, the ID can be transmitted to one or more chargers when communication are established. In some embodiments, power receiver clients may also be able to receive and identify other power receiver clients in a wireless power delivery environment based on the client ID.

An optional motion sensor 495 can detect motion and signal the control logic 410 to act accordingly. For example, when a device is receiving power at high frequencies, e.g., above 500 MHz, its location may become a hotspot of (incoming) radiation. Thus, when the device is on a person, e.g., embedded in a mobile device, the level of radiation may exceed acceptable radiation levels set by the Federal Communications Commission (FCC) or other medical/industrial authorities. To avoid any potential radiation issue, the device may integrate motion detection mechanisms such as accelerometers or equivalent mechanisms. Once the device detects that it is in motion, it may be assumed that it is being handled by a user, and would trigger a signal to the array either to stop transmitting power to it, or to lower the received power to an acceptable fraction of the power. In cases where the device is used in a moving environment like a car, train or plane, the power might only be transmitted intermittently or at a reduced level unless the device is close to losing all available power.

Figure 5:
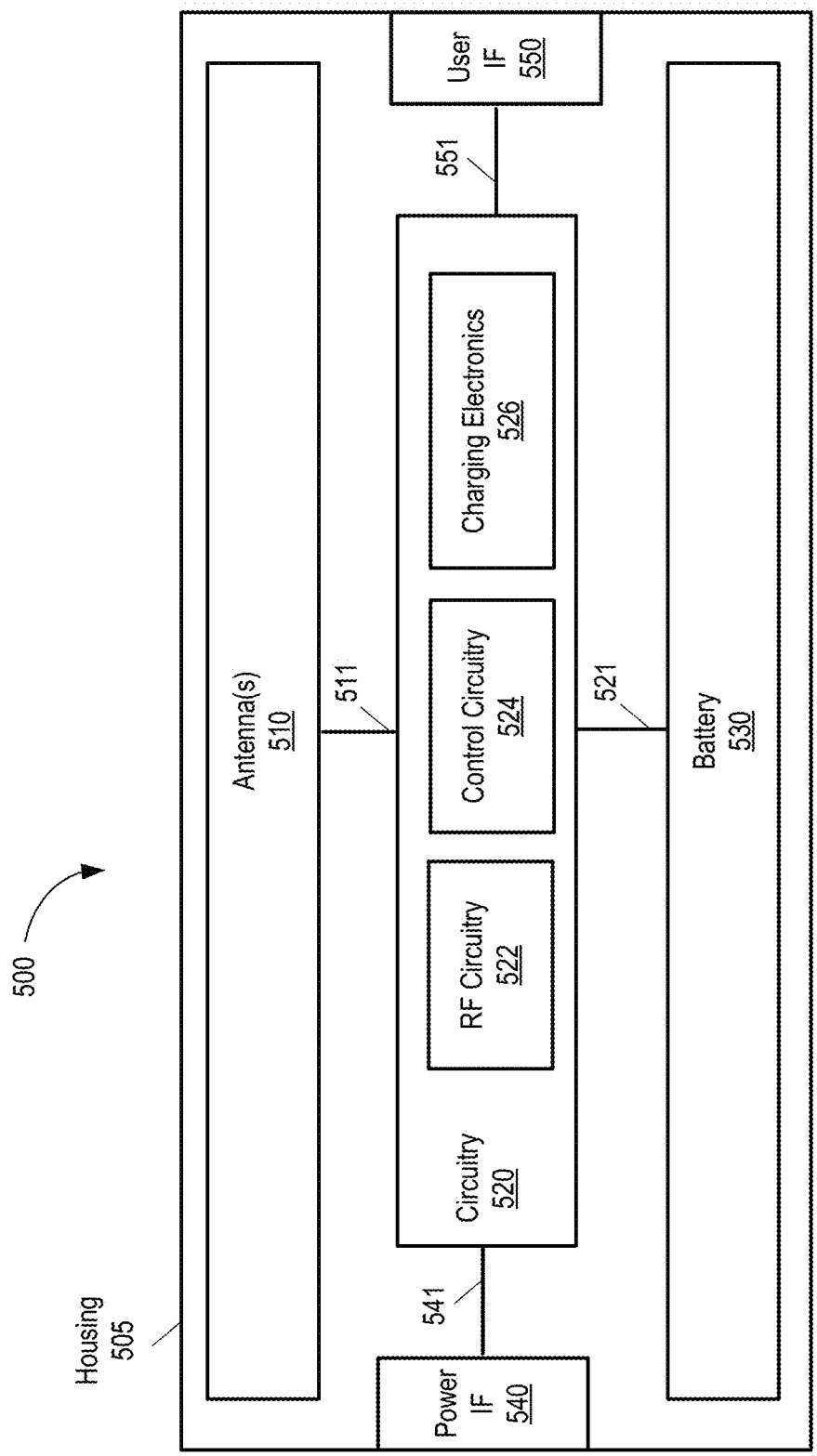
FIG. 5 depicts a block diagram illustrating example components of a wireless power reception apparatus for a portable electronic device, according to some embodiments.

II. Portable Device Apparatus with Integrated Wireless Power Receiving Facilities FIG. 5 depicts a block diagram illustrating example components of a wireless power reception apparatus 500 for a portable electronic device, according to some embodiments. As discussed herein, the portable electronic device can be any portable or mobile electronic device that is powered by a rechargeable battery, e.g., a mobile phone, tablet computer, etc. The wireless power reception apparatus can include some or all of the components of a wireless power receiver client, the components of which are discussed in greater detail above.

As shown in the example of FIG. 5, the wireless power reception apparatus 500 includes a housing 505, one or more antennas 510, circuitry 520, one or more batteries (or battery modules) 530, a power interface 540, and a user interface 550. The circuitry 520 includes radio frequency (RF) circuitry 522, control circuitry 524, and charging electronics 526. As shown in the example of FIG. 5, the one or more antennas 510 are connected to the circuitry 520 via a connection 511 and the circuitry is connected to the one or more batteries 530 via a connection 521. The circuitry is also connected to the power interface 540 via a connection 541 and to a user interface via a connection 551. The connections 511, 521, 541 and 551 may be traces on a printed circuit board, physical wires, or any other mechanism.

The housing 505 is configured to be removably attachable to a portable electronic device (not shown). In some embodiments, the housing 505 can be a sleeve that is removably attachable to the portable electronic device via one or more magnets, adhesives, clips, etc., including combinations or variations thereof. In some embodiments, the housing is designed in the form of a case or cover that cradles the portable electronic device. In some embodiments, the housing 505 is removably attachable to a portable electronic device by removing the back cover of the portable electronic device and attaching the housing 505. In such cases, the housing is designed with clips, e.g., plastic fasteners that are specifically designed to couple with the back cover of a specific device. In other embodiments, magnets can be used to attach the housing 505 to the portable electronic device. In yet other embodiments, the housing 505 can be designed to cradle the portable electronic device in a manner similar to a portable electronic protection cases. Example protection case embodiments are shown and discussed in greater detail with reference to FIGS. 10-12. The one or more antennas 510 are configured to receive a wireless power signal from a wireless charging system, e.g., a wireless charger. As discussed herein, the wireless power signals can include alternating current (AC) power.

As shown in the example of FIG. 5, the circuitry 520 includes RF circuitry 522, control circuitry 524 and charging electronics 526. As discussed herein, the one or more antennas can be located within the housing on one or more printed circuit boards (PCBs), flexible PCBs, embedded on or within the interior surface of the housing 505, and/or embedded on or within the exterior surface of the housing 505 including combinations and/or variations thereof.

Among other functions, the RF circuitry 522 and the control circuitry 524 can perform the various control functions of a wireless power receiver as discussed in greater detail above with reference to FIG. 4. For example, the RF circuitry 522 and/or other components of the circuitry 520 can process the wireless power received via the one or more antennas 510 and convert received wireless radio frequency (RF) power to direct current (DC) power. In some instances the received wireless RF power can be Alternating Current (AC) power. The charging electronics 526 can, among other functions, detect status information of the one or more batteries 530 and/or one or more internal battery of the portable electronic device to which the housing is attached and control the charging of the one or more batteries 530 based on this information. As discussed herein the one or more batteries 530 can store the DC power. In some embodiments, other storage technology can be used in lieu of or in addition to the one or more batteries. Alternatively, in some embodiments, the wireless power reception apparatus may not include a battery but instead directly charge one or more batteries of a portable electronic device to which it is removably attached.

The wireless power reception apparatus 500 can have one or more power interfaces 540 over which power and, in some instances also data, can be exchanged between the battery 530 and/or circuitry 520 and the portable electronic device when they are removably attached.

The user interface 550 can include an interface configured to provide information to a user of a portable electronic device and/or an interface configured to allow the user of the portable electronic device to provide information to the wireless power reception apparatus 500. In some embodiments, light emitting diodes (LEDs) can be used to indicate various statuses of the wireless power reception apparatus 500. For example, an LED can emit a particular color to indicate each battery charging state (e.g., low, med, or high) for battery 530. The user interface 550 can also include one or more user buttons or switches. For example, an ON/OFF switch can be provided on the wireless power reception apparatus 500 to control whether or not the apparatus should process wireless power. In other examples, a button can be provided that, once pressed, activates charging of the one or more batteries of a portable electronic device using the energy stored in the one or more batteries 530 of the wireless power reception apparatus 500. Other user interface embodiments are also possible.

Figure 6:
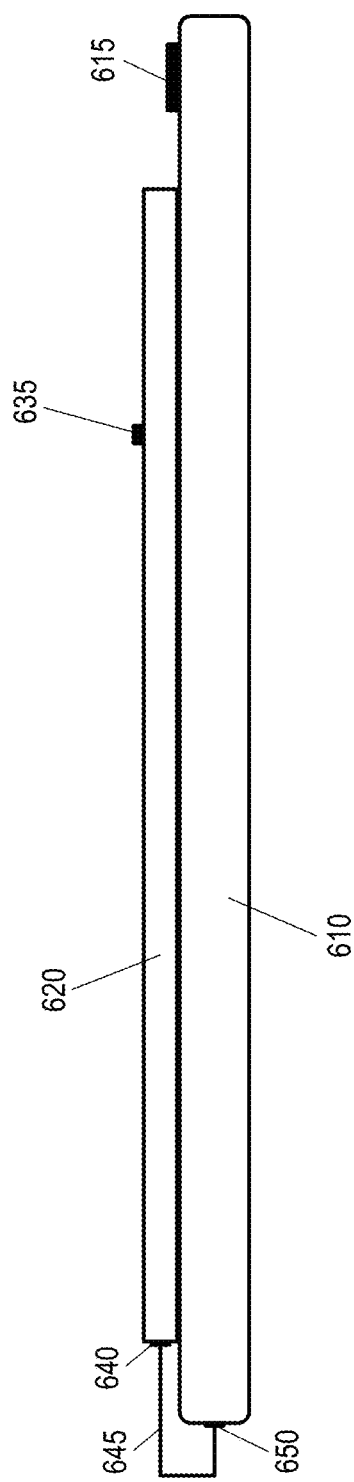
FIG. 6 depicts a wireless power reception apparatus that is attached and/or otherwise affixed to a portable electronic device, according to some embodiments.

FIG. 6 depicts a wireless power reception apparatus 620 that is attached and/or otherwise affixed to a portable electronic device 610, according to some embodiments. More specifically, the wireless power reception apparatus 620 is designed in the form of a mobile device sleeve that is removably attached to a back side of a mobile device 610. The wireless power reception apparatus 620 can be the wireless power reception apparatus 500 of FIG. 5, although alternative configurations are possible.

In the example of FIG. 6, the wireless power reception apparatus 620 is configured to receive, process and store wireless energy in one or more batteries (not shown). Advantageously, the stored wireless energy can be used to provide power to mobile device 610 directly or indirectly via one or more batteries of the mobile device 610. A power cord or cable 645 connects a power interface 640 of the wireless power reception apparatus 620 to a power/data port 650 of the mobile device 610. The power/data port 650 can be any input port over which power is received and provided to one or more batteries of the mobile device 610. By way of example, the power/data port 650 can be a micro USB port although other configurations are possible.

Although not shown, in some embodiments, the mobile phone sleeve 620 can be configured to inductively charge the mobile device 610 in addition to or in place of connecting the devices over the power cord or cable 645.

Figure 7A:
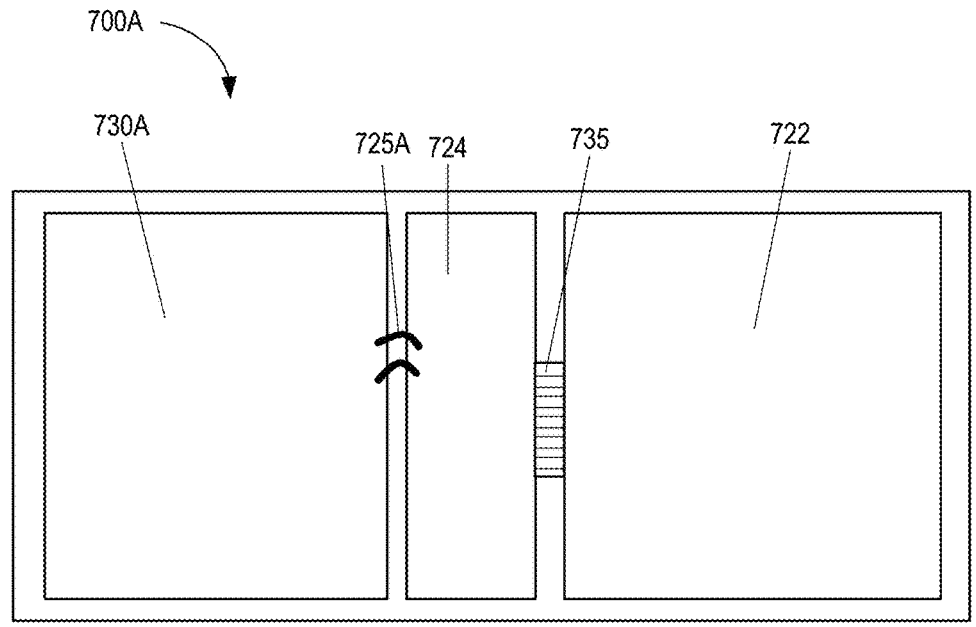
FIGS. 7A and 7B illustrate example components of wireless power reception apparatuses, according to some embodiments.
Figure 7B:
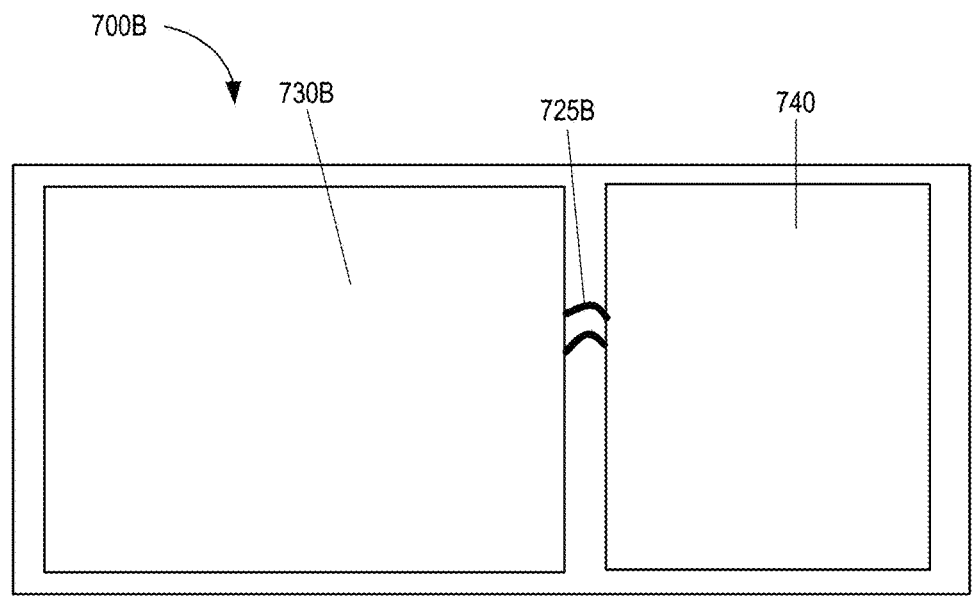

FIGS. 7A and 7B illustrate example components of wireless power reception apparatuses 700A and 700B, respectively, according to some embodiments. More specifically, FIG. 7A illustrates a wireless power reception apparatus 700A including separate boards 724 and 722 for control circuitry and antenna/RF circuitry, respectively, while FIG. 7B illustrates a combined board 740 including both control circuitry and antenna/RF circuitry.

The wireless power reception apparatus 700A includes a battery 730A, a control board 724 and an antenna/RF board 722. The battery 730A and the control board 724 are connected via a connection (e.g., wires) 725A and the control board 724 and the antenna/RF board 722 are connected via a connection (e.g., flex cable) 735. Similarly, the wireless power reception apparatus 700B includes a battery 730B and a combined control board and antenna/RF board 740 that are connected via a connection (e.g., wires) 725. Although not necessarily shown to scale the wireless power reception apparatus 700B can save real estate using the combined control and an antenna/RF board 740 and thus utilize a larger battery 730B.

Figure 8A:
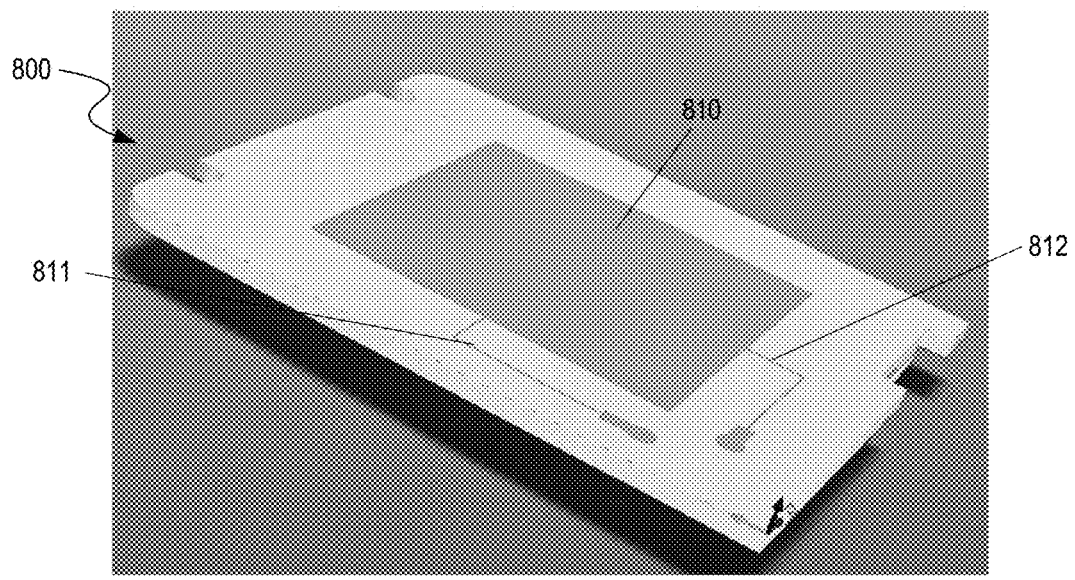
FIGS. 8A and 8B illustrate top and bottom perspective views, respectively, of an example antenna/RF board, according to some embodiments.
Figure 8B:
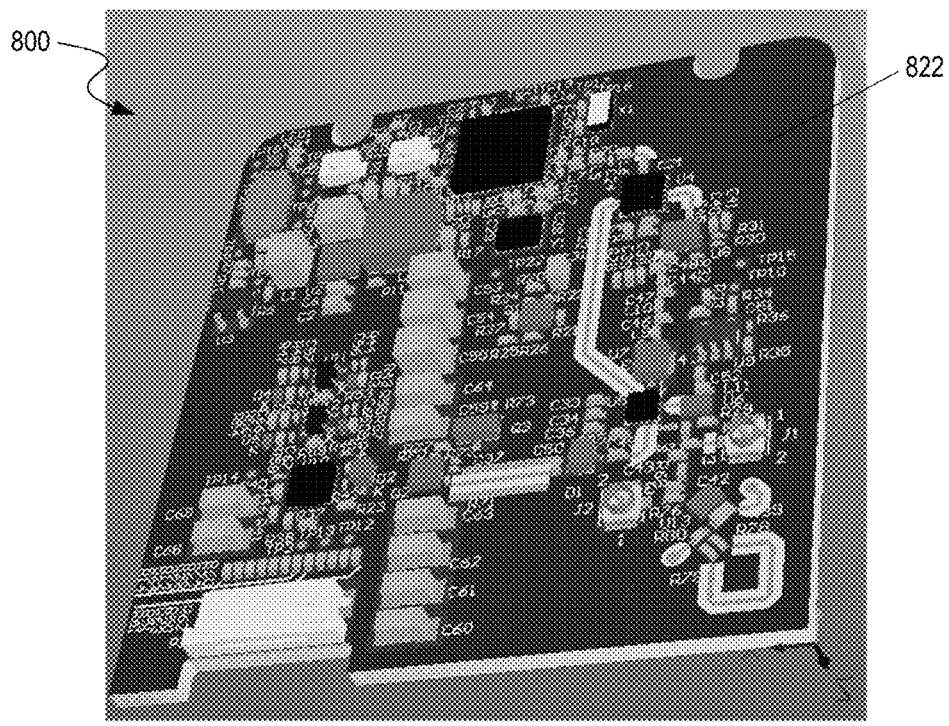

FIGS. 8A and 8B illustrate top and bottom perspective views, respectively, of an example antenna/RF board, according to some embodiments. The antenna/RF board 800 can be antenna/RF board 722 of FIG. 7, although alternative configurations are possible. As illustrated in the example of FIG. 8A, the top view of antenna/RF board 800 includes antennas 810 and antenna leads 811 and 812. The antennas 810 can be constructed onto the antenna/RF board 800 and/or otherwise embedded in the antenna/RF board 800. For example, the antennas 810 can be constructed and/or otherwise comprise thin film, copper tape or printed metal.

Figures 13A, 13B, 13C, 13D:
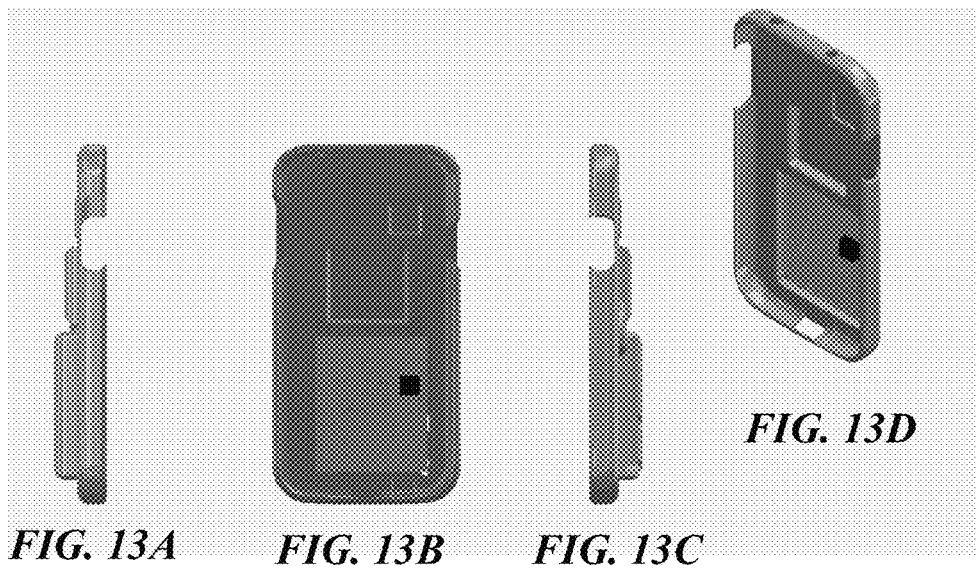
FIGS. 13A-13D depict additional examples/views of cases according to various embodiments with a mobile device inserted in the case and without a mobile device, respectively.

As discussed in greater detail below, the antenna 810 can be configured to have various polarizations such as linear (both horizontal and vertical) or circular. The antenna/RF board 800 and/or other components of a wireless power reception apparatus can, among other features, dynamically determine the optimal polarization of the antenna 810. An example illustrating dynamic selection of the optimal polarization of the antenna is shown and discussed in greater detail with reference to FIG. 13.

The bottom view of antenna/RF board 800 shown in FIG. 8B includes various electronic components for performing the functions discussed herein. In particular, the bottom view of the antenna/RF board 800 includes various antenna/RF circuitry 822.

Figure 9A:
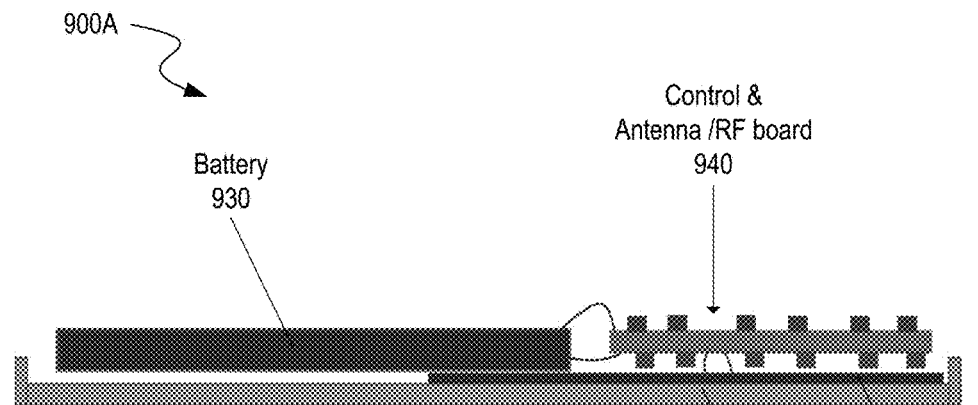
FIGS. 9A and 9B depict side views of example components of wireless power reception apparatuses, according to some embodiments.
Figure 9B:
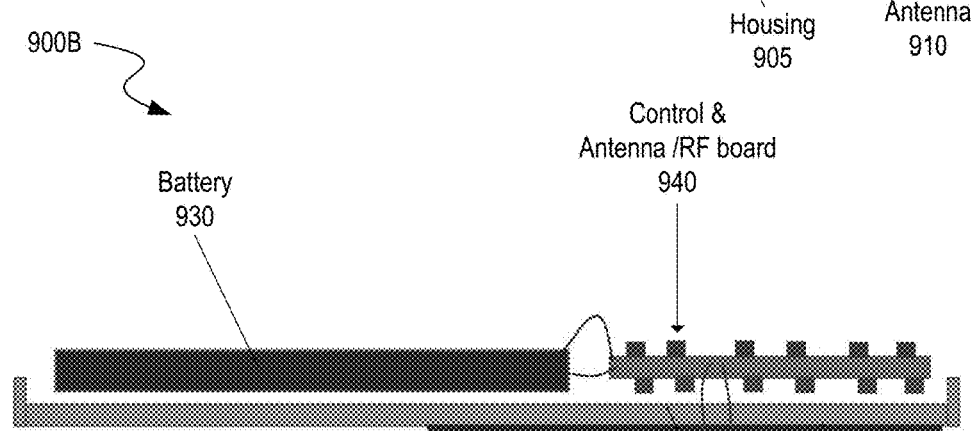

FIGS. 9A and 9B depict side views of example components of wireless power reception apparatuses 900A and 900B, respectively, according to some embodiments. The wireless power reception apparatuses 900A and 900B each include a battery 930, a control & antenna/RF board 940, a housing 905, and an antenna 910. However, the examples of FIGS. 9A and 9B illustrate different example placements of antenna 910. More specifically, the example of FIG. 9A illustrates the antenna 910 disposed on the inside of the housing 905 and the example of FIG. 9B illustrates the antenna 910 disposed on the outside of the housing 905. Advantageously, combining the control circuitry and the antenna/RF circuitry and embedding and/or otherwise placing the antenna 910 on the exterior surface (outside) of the housing 905 or on the inner surface of the housing 905 saves real estate in the wireless power reception apparatus for a larger battery.

Figure 10:
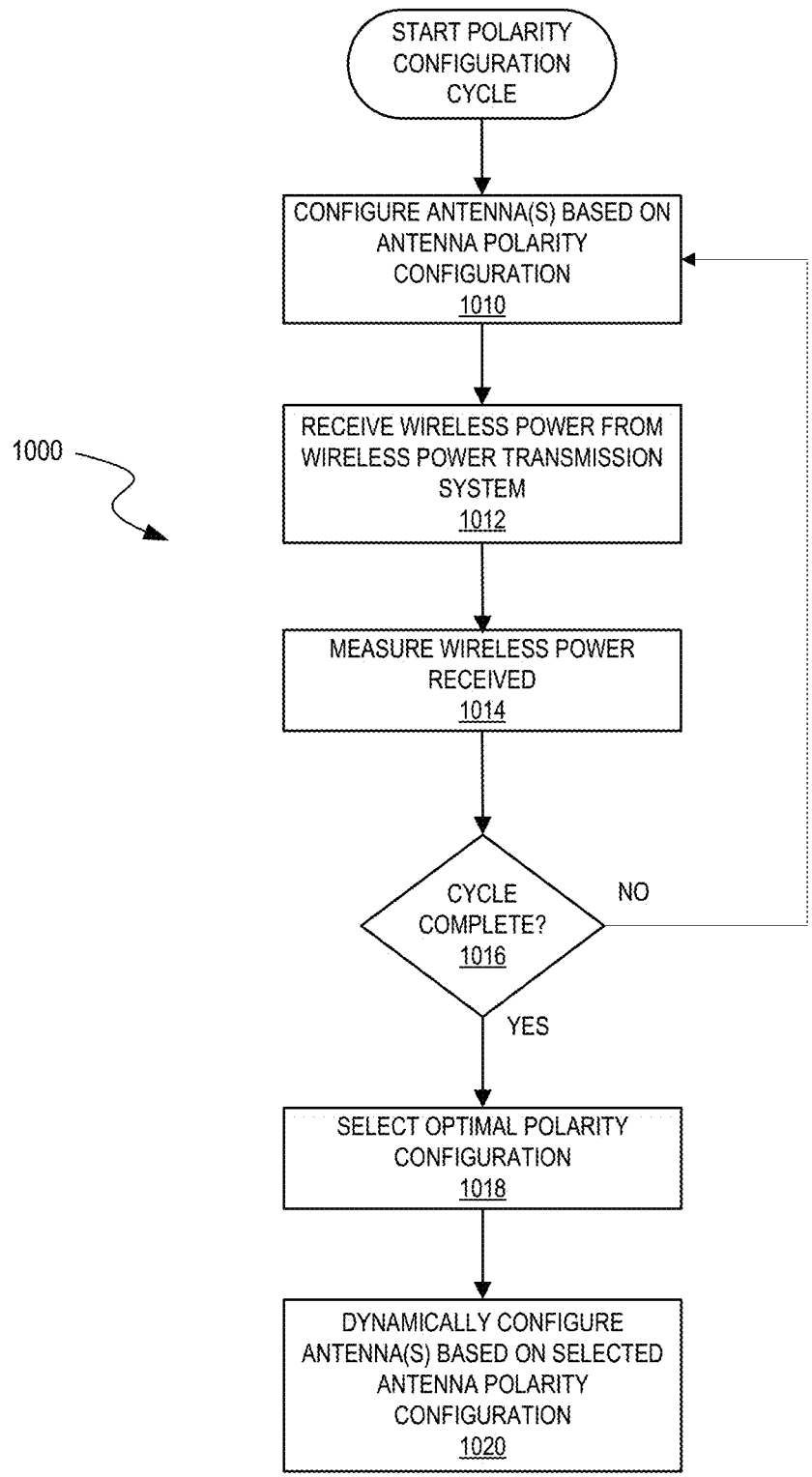
FIG. 10 depicts flow diagrams illustrating an example process for dynamically selecting an optimal antenna polarity, according to some embodiments.

FIG. 10 depicts flow diagrams illustrating an example process 1000 for dynamically selecting an optimal antenna polarity, according to some embodiments. More specifically, the example of FIG. 13 illustrates an example polarity configuration cycle whereby the optimal antenna polarity can be determined and configured. A wireless power reception apparatus can, among other functions, perform the corresponding steps of example process 1000. The wireless power reception apparatus can be wireless power reception apparatus 500 of FIG. 5, although alternative configurations are possible.

To begin, at step 1010, the wireless power reception apparatus configures the antenna(s) based on a first of multiple antenna polarity configurations or modes. Initially, the wireless power reception apparatus configures the antenna polarity to a "default" or base mode. As discussed herein, the wireless power reception apparatus includes one or more antennas having configurable polarity. In some embodiments, the polarity is configured by adjusting, e.g., activating or deactivating, antenna feeds. An example is shown and discussed in greater detail with reference to FIG. 8A.

At step 1012, the wireless power reception apparatus receives power from a wireless power transmission system, e.g., wireless charger. At step 1014, the wireless power reception apparatus processes the received wireless power and measures a quantity or amount of wireless power received. Alternatively or additionally, the wireless power reception apparatus may measure the signal strength of the received wireless power signals. In some embodiments, the wireless power reception apparatus saves and/or otherwise stores the measured power or signal strength measurement in conjunction with the antenna polarity mode.

At decision step 1016, the wireless power reception apparatus determines if the wireless power reception apparatus has cycled through each of the antenna polarity modes. If not, the process continues at step 1010 with the wireless power reception apparatus configuring the next antenna polarity configuration. However, if the wireless power reception apparatus has cycled through each of the antenna polarity modes, at step 1018, the wireless power reception apparatus selects an optimal polarity configuration or antenna polarity mode. As discussed herein, the optimal antenna polarity is the polarity at which the wireless power reception apparatus receives the most wireless power or the strongest signal from one or more chargers within a wireless power delivery environment. Lastly, at step 1020, the antennas are configured based on the selected antenna polarity configuration if they are not already configured in the selected mode.

Figure 11A:
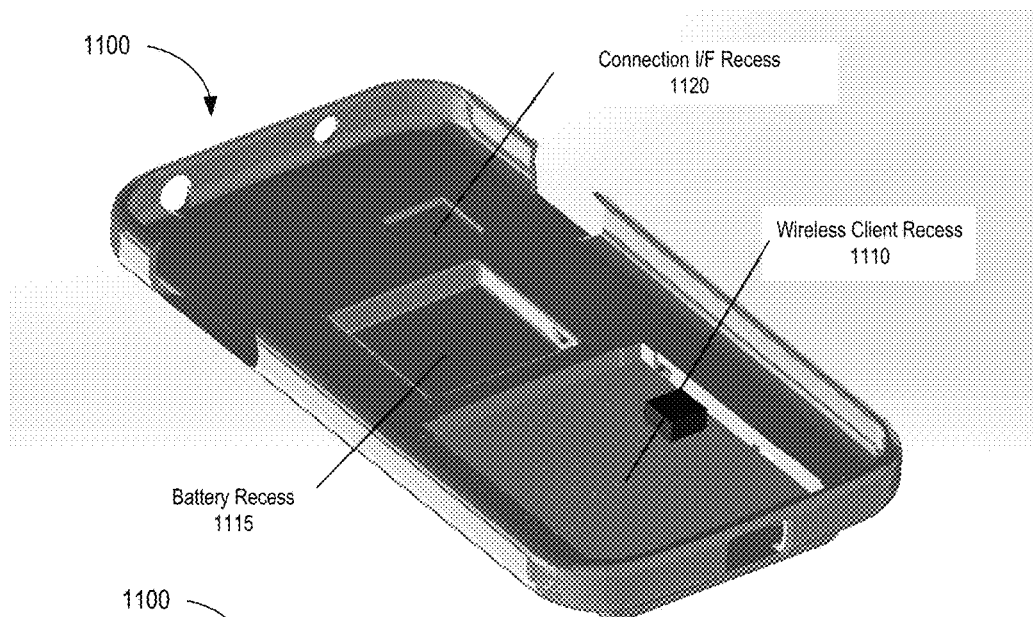
FIGS. 11A and 11B illustrate top perspective and rear perspective views of a wireless power reception apparatus in the form of a mobile device case, according to various embodiments.
Figure 11B:
Figures 12A, 12B, 12C, 12D:
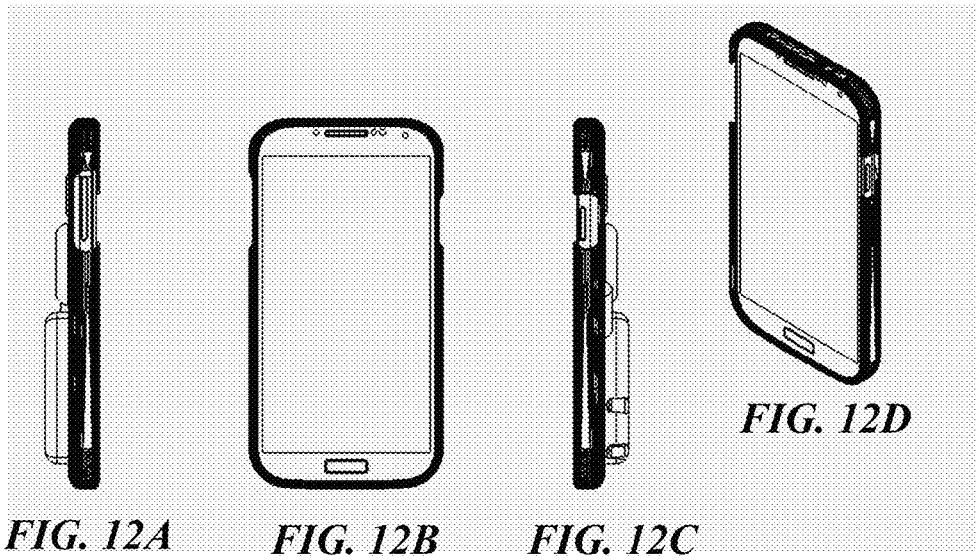
FIGS. 12A-12D depict additional examples/views of cases according to various embodiments with a mobile device inserted in the case and without a mobile device, respectively.

FIGS. 11A and 11B illustrate top perspective and rear perspective views of a wireless power reception apparatus in the form of a mobile device case, according to various embodiments. More specifically, as illustrated in the examples of FIGS. 11A and 11B, the mobile device case comprises a case for smart phone devices such as iPhone or Android devices. Cases for other mobile devices including tablets, game controllers, etc. are also possible.

As illustrated in the examples of FIGS. 11A and 11B, the mobile device cases include recesses 1110, 1115 and 1120 for a wireless client (wireless power receiver), battery, and client connection interface, respectively. Additional or fewer recesses are possible. For example, in some embodiments, one or both of the client connection interface recess 1120 and the battery recess 1115 may not be present.

In some embodiments, a battery (not shown) is configured to fit into the battery recess 1115 and provide power to the wireless client (not shown). A wireless client as discussed herein is configured to fit into the wireless client recess 1110. The battery in the battery recess 1115 is charged by wireless power received and processed by the wireless client. In operation, the wireless client receives RF wireless power, rectifies the power, and transmits the power to the mobile device (e.g., phone) battery via the client connection interface 1120 (e.g., 5V and Ground pins). In some embodiments, the case does not have a battery and the wireless client (wireless power receiver) provides power to itself and to the mobile device (e.g., phone) battery via the client connection interface 1120 (e.g., 5V and Ground pins).

In some embodiments, the case has a battery that powers the mobile device (e.g., phone) via the client connection interface 1120 (e.g., 5V and Ground pins). In this case, the wireless client (wireless power receiver) provides rectified power to the case battery which, in turn, provides the mobile device (e.g., phone) battery with power through the client connection interface 1120.

FIGS. 12A-12D and 13A-13D show additional examples/views of cases according to various embodiments with a mobile device inserted in the case and without a mobile device, respectively.

Figure 14:
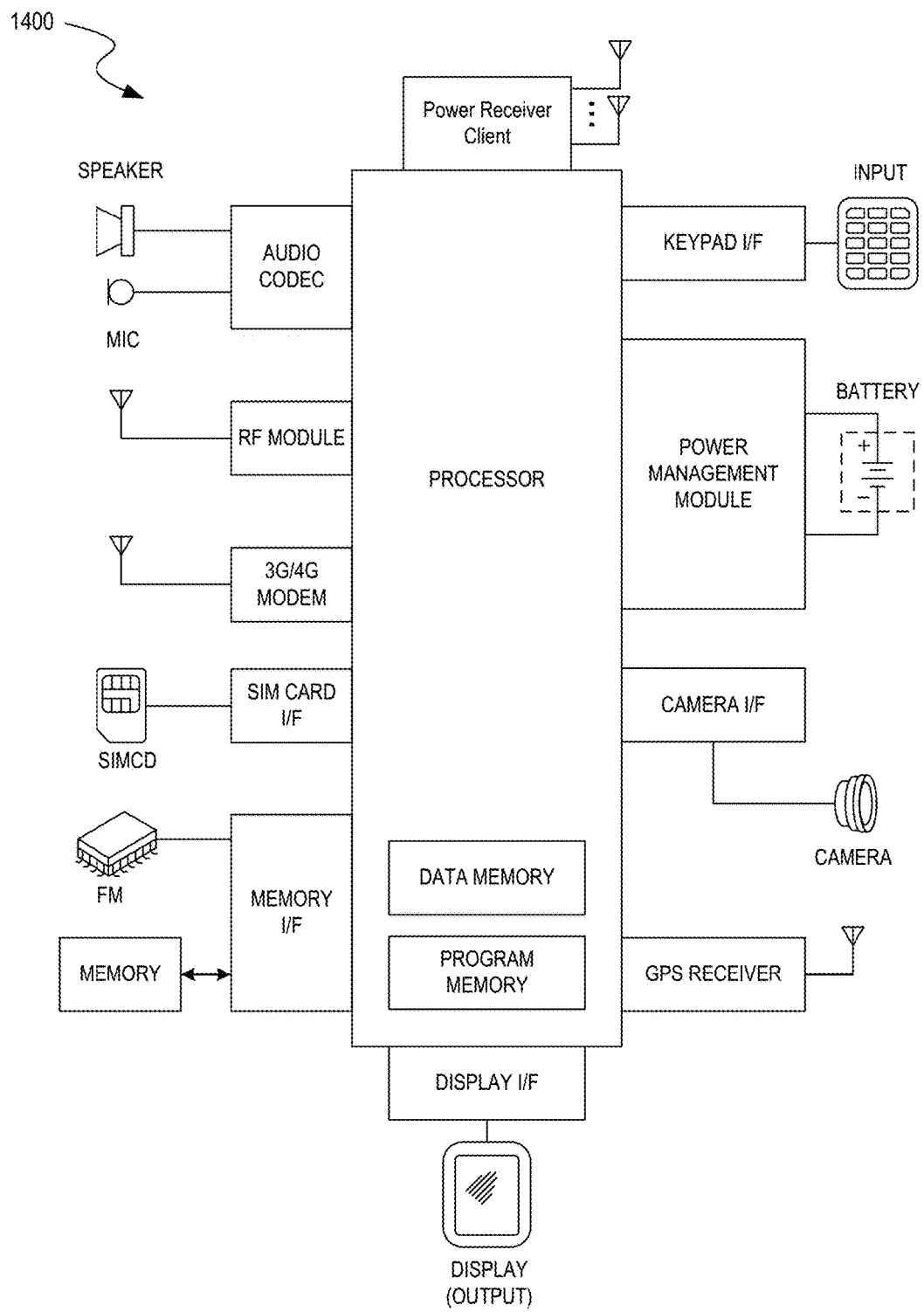
FIG. 14 depicts a block diagram illustrating example components of a representative mobile device or tablet computer with a wireless power receiver or client in the form of a mobile (or smart) phone or tablet computer device, according to some embodiments.

FIG. 14 depicts a block diagram illustrating example components of a representative mobile device or tablet computer 1400 with a wireless power receiver or client in the form of a mobile (or smart) phone or tablet computer device, according to an embodiment. Various interfaces and modules are shown with reference to FIG. 14, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RFID transceivers, along with antennas, can populate the Printed Circuit Board.

The wireless power receiver client can be a power receiver clients 103 of FIG. 1, although alternative configurations are possible. Additionally, the wireless power receiver client can include one or more RF antennas for reception of power and/or data signals from a charger, e.g., charger 101 of FIG. 1.

Figure 15:
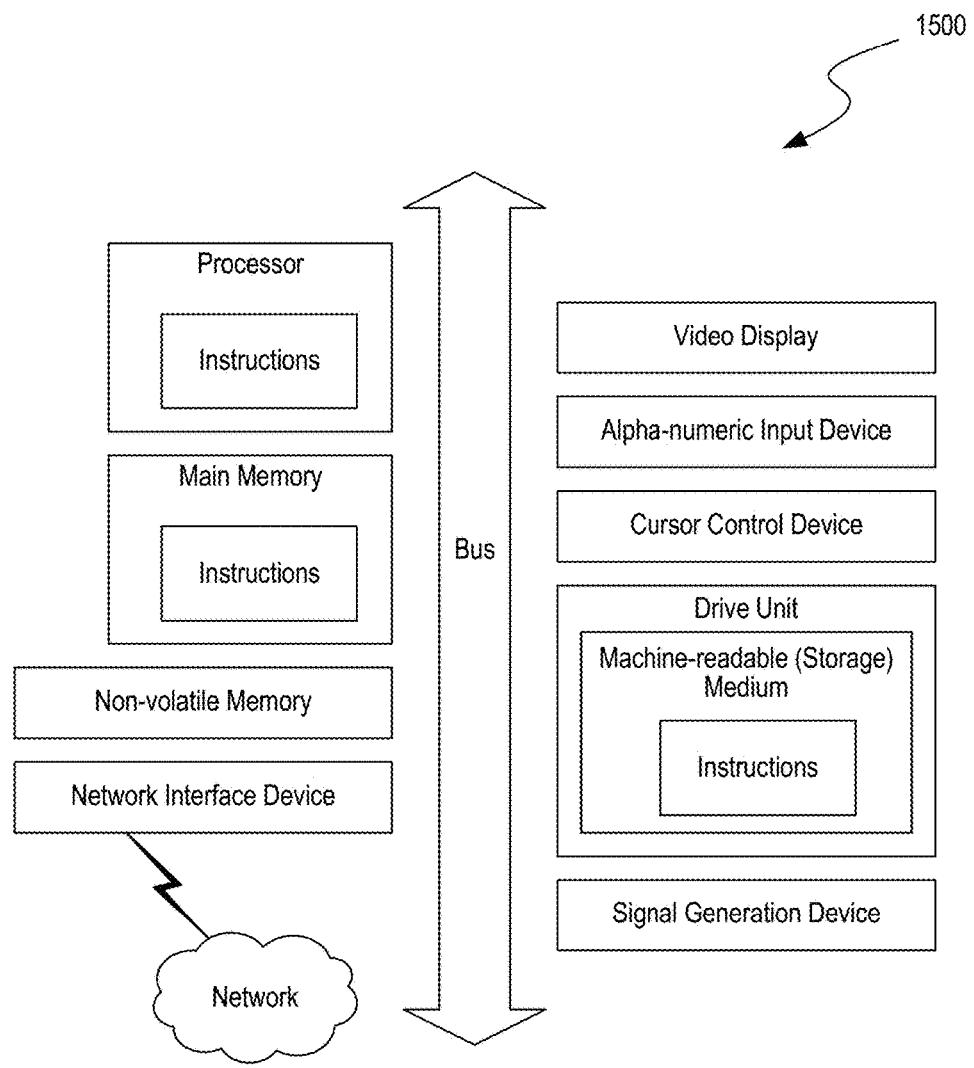
FIG. 15 depicts a diagrammatic representation of a machine, in the example form, of a computer system within which a set of instructions, for causing the machine to perform any one or more of the methodologies discussed herein, may be executed.

FIG. 15 depicts a diagrammatic representation of a machine, in the example form, of a computer system within which a set of instructions, for causing the machine to perform any one or more of the methodologies discussed herein, may be executed.

In the example of FIG. 15, the computer system includes a processor, memory, non-volatile memory, and an interface device. Various common components (e.g., cache memory) are omitted for illustrative simplicity. The computer system 1500 is intended to illustrate a hardware device on which any of the components depicted in the example of FIG. 1 (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 15 reside in the interface.

In operation, the computer system 1500 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A wireless power reception apparatus for a portable electronic device, the wireless power reception apparatus comprising:
 a housing configured to be removably attachable to the portable electronic device;
 one or more antennas situated with the housing, the one or more antennas configured to transmit a beacon signal to a wireless charging system via a plurality of paths and responsively receive a coherent radio frequency (RF) wireless power signal from the wireless charging system via multiple of the plurality of paths; and
 a wireless power receiver disposed within the housing, the wireless power receiver configured to:
 convert the coherent RF wireless power signal received at the one or more antennas via the multiple paths to direct current (DC) power and provide the DC power to the portable electronic device via a power interface port;
 cycle through each of multiple antenna polarity configurations while measuring the DC power received using each of the multiple antenna polarity configurations;
 select an antenna polarity configuration of the multiple antenna polarity configurations that yields the most DC power or a strongest RF wireless power signal; and
 dynamically configure a polarity of at least one antenna of the one or more antennas using the selected antenna polarity configuration.

2. The wireless power reception apparatus of claim 1, wherein antenna feeds are activated or deactivated to configure the polarity of the at least one antenna.

3. The wireless power reception apparatus of claim 1, further comprising:
 one or more battery modules configured to store the DC power; and
 an input interface disposed on the housing, wherein the power interface port is configured to provide the DC power to one or more batteries of the portable electronic device responsive to activation of the input interface.

4. The wireless power reception apparatus of claim 1, wherein the housing is removably attachable to the portable electronic device via one or more of magnets, adhesives, or clips.

5. The wireless power reception apparatus of claim 1, wherein the one or more antennas are situated within an inner portion of the housing.

6. The wireless power reception apparatus of claim 1, wherein the one or more antennas situated within an outer portion of the housing.

7. The wireless power reception apparatus of claim 1, wherein the wireless power receiver includes:
 one or more electronic circuit boards situated within the housing.

8. The wireless power reception apparatus of claim 7, wherein the one or more electronic circuit boards include radio frequency (RF) circuitry, control circuitry, and charging electronics.

9. The wireless power reception apparatus of claim 1, wherein the housing is constructed of a radio frequency (RF) transparent material.

10. The wireless power reception apparatus of claim 1, wherein the housing comprises at least one of the one or more antennas.

11. The wireless power reception apparatus of claim 1, wherein the housing comprises one or more reflector or director planes.

12. The wireless power reception apparatus of claim 11, wherein at least one of the one or more reflector or director planes is situated on an inner surface or an outer surface of the housing.

13. The wireless power reception apparatus of claim 11, wherein at least one of the one or more reflector or director planes is constructed using thin film, copper tape or printed metal.

14. A wireless power reception sleeve for a portable electronic device, the wireless power reception sleeve comprising:
 a housing configured to be removably attachable to the portable electronic device;
 one or more antennas situated on or within the housing, the one or more antennas configured to transmit a beacon signal to a wireless charging system via a plurality of paths and responsively receive wireless radio frequency (RF) power from the wireless charging system via multiple of the plurality of paths;

one or more electronic circuit boards situated within the housing, the one or more electronic circuit boards configured to:

convert the wireless radio frequency (RF) power to direct current (DC) power, cycle through each of multiple antenna polarity configurations while measuring the DC power received using each of the multiple antenna polarity configurations;

select an antenna polarity configuration of the multiple antenna polarity configurations that yields the most DC power or a strongest RF wireless power signal; and dynamically configure a polarity of at least one antenna of the one or more antennas using the selected antenna polarity configuration by activating or deactivating antenna feeds;

one or more battery modules configured to store the DC power; and a power interface port disposed on the housing, the power interface port configured to provide the stored DC power to one or more batteries of the portable electronic device.

15. The wireless power reception sleeve of claim 14, further comprising:

a button disposed on the housing, wherein the power interface port is configured to provide the DC power to the one or more batteries of the portable electronic device responsive to activation of the button.

16. The wireless power reception sleeve of claim 14, wherein the one or more antennas are situated within an inner portion of the housing and, wherein the housing is constructed of a radio frequency (RF) transparent material.

17. The wireless power reception sleeve of claim 14, further comprising:

a charging status indicator, a connection status indicator or a charger detection status indicator disposed on the housing.

18. A wireless power reception case for a portable electronic device, the wireless power reception case comprising:

a housing configured to be removably attachable to the portable electronic device;

one or more antennas disposed on or within the housing, the one or more antennas configured to receive wireless alternating current (AC) power from a wireless charging system;

one or more electronic circuit boards situated within the housing, the one or more electronic circuit boards configured to:

convert the wireless radio frequency (RF) power to direct current (DC) power;

cycle through each of multiple antenna polarity configurations while measuring the DC power received using each of the multiple antenna polarity configurations;

select an antenna polarity configuration of the multiple antenna polarity configurations that yields the most DC power or a strongest RF wireless power signal; and dynamically configure a polarity of at least one antenna of the one or more antennas using the selected antenna polarity configuration; and an inductive charging interface disposed on the housing, the interface configured to inductively charge the portable electronic device using the DC power.

19. The wireless power reception case of claim 18, wherein the antenna feeds are activated or deactivated to configure the polarity of the at least one antenna.

20. The wireless power reception case of claim 18, further comprising:

a charging status indicator, a connection status indicator or a charger detection status indicator disposed on the housing.

\* \* \* \* \*